United States Patent [19]

Peloza

[11] 4,428,231

[45] Jan. 31, 1984

[54] VISCOUS LINK DRIVE FOR FLUID FLOWMETER

[75] Inventor: Kirk B. Peloza, Glen Ellyn, Ill.

[73] Assignee: Eaton Corporation, Cleveland, Ohio

[21] Appl. No.: 325,782

[22] Filed: Nov. 30, 1981

[51] Int. Cl.³ .............................................. G01F 5/00
[52] U.S. Cl. ..................................................... 73/202
[58] Field of Search ............... 73/202, 861.59, 861.52, 73/861.61, 118 A

[56] References Cited

U.S. PATENT DOCUMENTS

| | | | |
|---|---|---|---|
| 576,249 | 2/1897 | Bassett | 73/202 |
| 790,888 | 4/1905 | Ferris . | |
| 1,944,316 | 1/1974 | Duerr | 158/99 |
| 3,308,662 | 3/1967 | Maurer | 73/231 |
| 3,407,657 | 10/1968 | Maurer | 73/203 |
| 3,559,482 | 2/1971 | Baker et al. | 73/202 X |
| 3,834,230 | 9/1974 | Auerbach | 73/199 |
| 4,015,473 | 4/1977 | Kleuters | 73/205 |
| 4,107,991 | 8/1978 | Benson | 73/204 |
| 4,112,757 | 9/1978 | Hayward | 73/207 |
| 4,136,565 | 1/1979 | Migrin | 73/212 |
| 4,163,390 | 8/1979 | Rodder | 73/204 |
| 4,164,144 | 8/1979 | Kaiser | 73/213 |
| 4,182,165 | 1/1980 | Kita | 73/194 |
| 4,210,016 | 7/1980 | Peter | 73/116 |
| 4,213,335 | 7/1980 | Peter | 73/204 |
| 4,214,478 | 7/1980 | Lauterbach | 73/204 |
| 4,228,768 | 10/1980 | Kita | 123/494 |
| 4,245,502 | 1/1981 | Eiermann | 73/204 |
| 4,264,961 | 4/1981 | Nishimura et al. | 73/204 X |

FOREIGN PATENT DOCUMENTS 155631 10/1963 U.S.S.R. .
544000 7/1942 United Kingdom .

Primary Examiner—Gerald Goldberg
Assistant Examiner—Brian Tumm
Attorney, Agent, or Firm—C. H. Grace; J. G. Lewis; R. A. Johnston

[57] ABSTRACT

A low pressure drop hot film mass air flowmeter (10) for an automotive engine is disclosed. The flowmeter includes a main air flow passage (20), a fixed contoured flow nozzle (22) disposed in the main air flow passage to establish a localized pressure differential thereacross and, a closed circuitous recirculation path (40) disposed adjacent the main air flow passage and in fluid communication therewith through an inlet port (42) disposed upstream of the flow nozzle and an outlet port (44) disposed downstream from the flow nozzle. Pressure differential at the ports establishes a substantially laminar control flow therebetween within the recirculation path which, in turn, by viscous action, establishes a recirculation flow (67) within the recirculation path. A constant temperature thermal anemometer (54) includes a hot film probe (56) and a temperature compensating probe (58) positioned to sense the recirculating air within the recirculation path. In the preferred embodiment of the invention, a second contoured flow nozzle (96) is disposed within the recirculation path to facilitate flow sensing therein. The anemometer generates an output signal representative of total mass air flow through the flowmeter.

27 Claims, 7 Drawing Figures

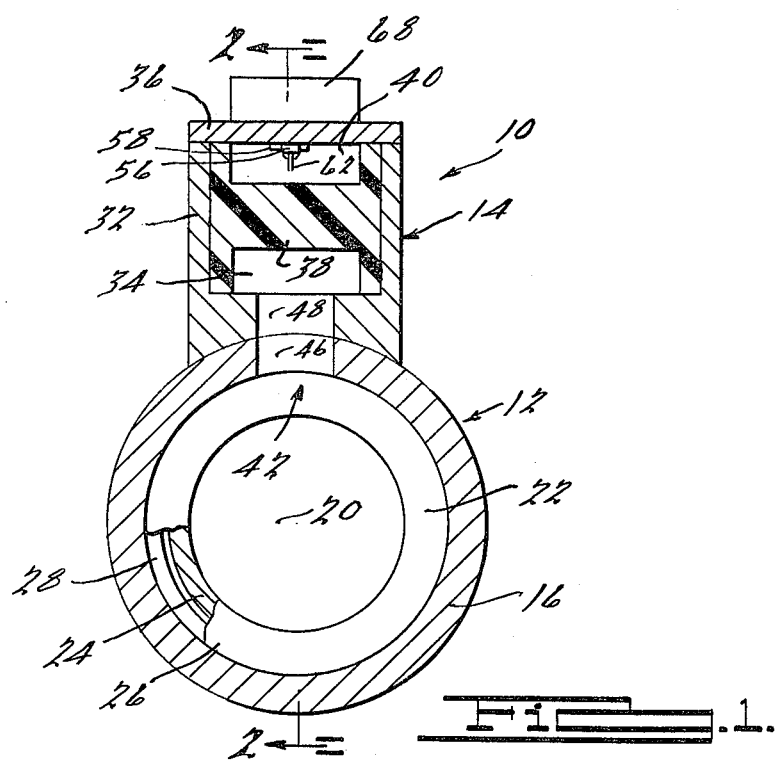
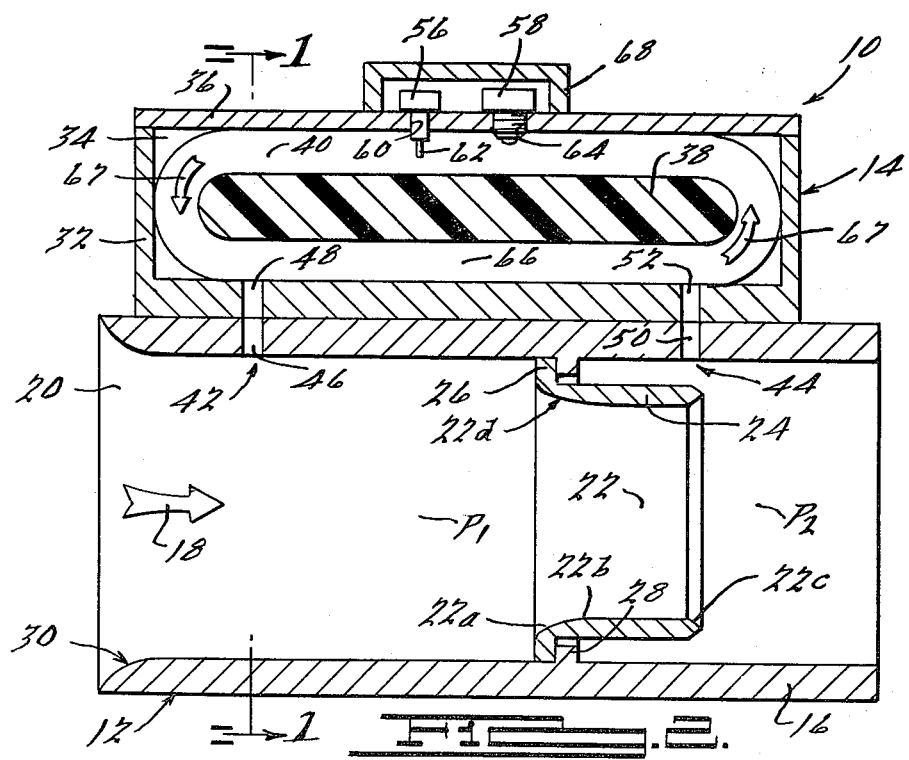
FIG. 1.
FIG. 2.

VISCOUS LINK DRIVE FOR FLUID FLOWMETER

FIELD OF THE INVENTION

This invention relates to fluid flowmeters in general and particularly to such flowmeters designed specifically for use in controlling automotive internal combustion engines.

CROSS REFERENCE

The invention described in the present application represents an alternative approach to that described in U.S. Ser. No. 265,119 May 19, 1981 and U.S. Ser. No. 300,790 filed Sept. 10, 1981, and is related to the inventions described in U.S. Pat. Nos. 4,164,144; 4,136,565, 4,232,549 and 4,282,751 as well as U.S. Ser. No. 187,294 filed Sept. 15, 1980 now U.S. Pat. No. 4,324,143.

BACKGROUND OF THE INVENTION

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e. the drop in pressure is a drop in total pressure. Venturi flowmeters are low energy loss devices relative to orifice plate flowmeters since most of the pressure drop in the venturi throat is recoverable at the venturi outlet, i.e. the drop in pressure in the throat is due to an increase in kinetic energy of the fluid. However, when either of these flowmeters are used to measure fluid flow which varies over a wide range, such as air flow to an automotive engine, they either overly restrict total air flow at high engine speeds and loads if they are sized small enough to provide an adequate differential signal at low engine speeds and loads, or they provide an inadequate differential pressure signal at low engine speeds and loads if they are sized larger.

One prior art patent proposed a fluid flowmeter having a main air flow passage and a relatively small venturi in the main passage for receiving a portion of the total air flow and providing a static pressure signal for determining volumetric air flow in conjunction with a stagnation pressure signal in the main passage. This same patent also proposed placing a restriction in the main passage between the venturi inlet and outlet to increase the pressure difference across the venturi and thereby increase the pressure difference between the static and stagnation pressure. However, the restriction has the disadvantage of increasing the total pressure drop across the flowmeter, thereby increasing energy losses and decreasing the operating range of the flowmeter.

An additional shortcoming of many prior art devices resides in the fact that they are dedicated to a particular application and cannot easily be adjusted or reconfigured to accommodate differing applications or operational variations in a given application from system to system. For example, many flowmeters intended for automotive application are designed for an engine of known displacement and idealized respiration characteristics. Such flowmeters are often unsuitable for engines of slightly differing displacement or engines of the same displacement which fall in the outer fringe of design tolerances.

One prior art approach to effectively increase the operating range of a flowmeter while maintaining an acceptable pressure signal level is the bypass, which operates to shunt some of the fluid flowing through the meter around the swirl vanes, orifice, venturi or other signal generating element therein. Although such devices extend the range of operation, they have two major shortcomings. First, an inherent error factor is invited when the totality of air flow is not measured inasmuch as the ratio of measured air flow to bypassed air flow may vary. Additionally, such devices add mechanical complexity with its incumbent cost, reduced response (due to the mass of the moving parts) and shortened lifetime (due to the exposure of the interface between moving and non-moving parts to moisture and contaminants within the air flow). Finally, the use of pneumatic sensing techniques, although enjoying some commercial success, suffers from the frailties of requiring sensing ports which can become blocked by foreign matter and may have an unacceptably short useful life.

Another prior art approach which overcomes some of the shortcomings of pneumatic sensing is the use of hot wire/film anemometers or the like. Such devices operate by presenting a temperature dependent resistive element to the fluid flow and pass a current therethrough. The cooling effect of the fluid as it impinges upon the sensor is offset by modulation of the control voltage or current to maintain the resistor at a constant temperature. The variation of voltage or current is a measure of air flow. A substantial amount of literature has appeared recently relating to such techniques as reflected in many prior art patents.

The hot wire anemometer, however, has several shortcomings of its own. One shortcoming is lack of accuracy. Because the heated element is fixed within a fluid passageway and the velocity inlet profile of the fluid varies substantially with various operating conditions, prior art units were forced to tolerate nominal or compromise arrangements which built in error to the fluid flow measuring process. A related problem was in the fact that the temperature sensing elements were fixed within the passageway and could not be readily calibrated once the unit was fully assembled. The most serious shortcoming, however, was in the inherent fragile nature of the flow sensing elements and their tendency to collect contaminates on the surface thereof. Prior art designs, in order to improve response characteristics of the device attempted to minimize the thermal mass of the sensing element by making it extremely fine. Although successful laboratory tests were achieved, the application of such devices in a relatively hostile automotive environment where foreign particle matter passes through the meter at high velocity leads to catastrophic failure of the device by breakage of the sensing element as well as reduced heat transfer (and thus inaccuracies) from contamination. The elements were also extremely sensative to engine backfire.

BRIEF DESCRIPTION OF THE INVENTION

The present invention overcomes the above described shortcomings by providing a fluid flowmeter which employs constant temperature thermal anemometer techniques to generate a usable output signal representative of total fluid flow while maintaining an extremely durable yet simple and inexpensive design. This is accomplished by an inventive flowmeter comprising a main passage for fluid flow, flow restricting means within the main passage which establishes a pressure differential thereacross, a closed recirculation path disposed adjacent the main passage and in fluid communication therewith through an inlet port upstream of the restriction means and an outlet port downstream of the restriction means and, finally, means to monitor fluid flowing in the recirculation path which generates a fluid condition signal as a function thereof. This arrangement provides the advantage of a simple flowmeter design which has extremely fast response, increased low-end sensitivity, permits mass flow measurement without use of a pneumatic pressure sensor, eliminates fragile construction problems typical of hot wire sensors, reduces top end total pressure drop and reduces contamination and induced calibration shift.

In the preferred embodiment of the invention, the fluid flow monitoring means comprises a constant temperature thermal anemometer which operates to monitor the rate of flow of fluid in the recirculation path and generates a total flow rate output signal as a function thereof. This arrangement has the advantage of providing an extremely sensitive flowmeter having no moving parts and is substantially impervious to foreign particle matter in the main flow stream.

According to another aspect of the invention, the aneomometer includes an ambient temperature compensating probe which measures the ambient temperature of the fluid entering the flowmeter and recalibrates the anemometer to factor out the effects of temperature change in flow rate calculations. This arrangement has the advantage of providing a fluid flowmeter which produces a usable output signal representative of true mass flow rate over widely varying ambient temperature conditions.

According to another aspect of the invention, a second nozzle or flow restricting means is disposed within the recirculation path to establish a localized region of increased recirculation flow rate. The anemometer's heated probe is disposed within that region. This arrangement has the advantage of providing a fluid flowmeter having improved response characteristics.

According to another aspect of the invention, the recirculation path flow nozzle includes an inlet and throat portion defining a contour which is substantially identical to a contour defined by a throat and inlet of the flow nozzle in the main passage. This arrangement has the advantage of providing flow characteristics in fluid passing through the recirculation path flow nozzle which directly correlate to flow characteristics of fluid flowing through the main passage flow nozzle.

According to still another aspect of the invention, as an alternative embodiment, a swirl vane-venturi assembly is provided within the main passage in place of the flow nozzle. The venturi extends substantially parallel to the main passage and includes an inlet for receiving a portion of the fluid flowing therein, a throat and an outlet for discharging the portion back into the main passage. Swirl vanes are provided to receive a portion of the fluid which does not pass through the venturi and impart a velocity vector thereto tangential to the axis of the main passage for creating a reduced pressure area at the outlet of the venturi. The outlet port interconnects the recirculation path with the throat of the venturi. This arrangement has the advantage of establishing forced aspiration through the venturi to provide an increased pressure differential between the inlet and outlet ports while minimizing total pressure drop across the fluid flowmeter.

These and other features and advantages of the invention will become apparent upon reading the following specification, which, along with the patent drawings, describes and discloses preferred and alternative embodiments of the invention in detail.

The detailed description of the specific embodiments makes reference to the accompanying drawings.

BRIEF DESCRIPTION OF THE DRAWINGS

FIG. 1, is a cross-sectional fragmented end view of the preferred embodiment of an inventive fluid flowmeter taken on line 1—1 of FIG. 2;

FIG. 2, is a cross-sectional view taken on line 2—2 of FIG. 1;

DETAILED DESCRIPTION OF THE PREFERRED AND ALTERNATIVE EMBODIMENTS

Figure 3:
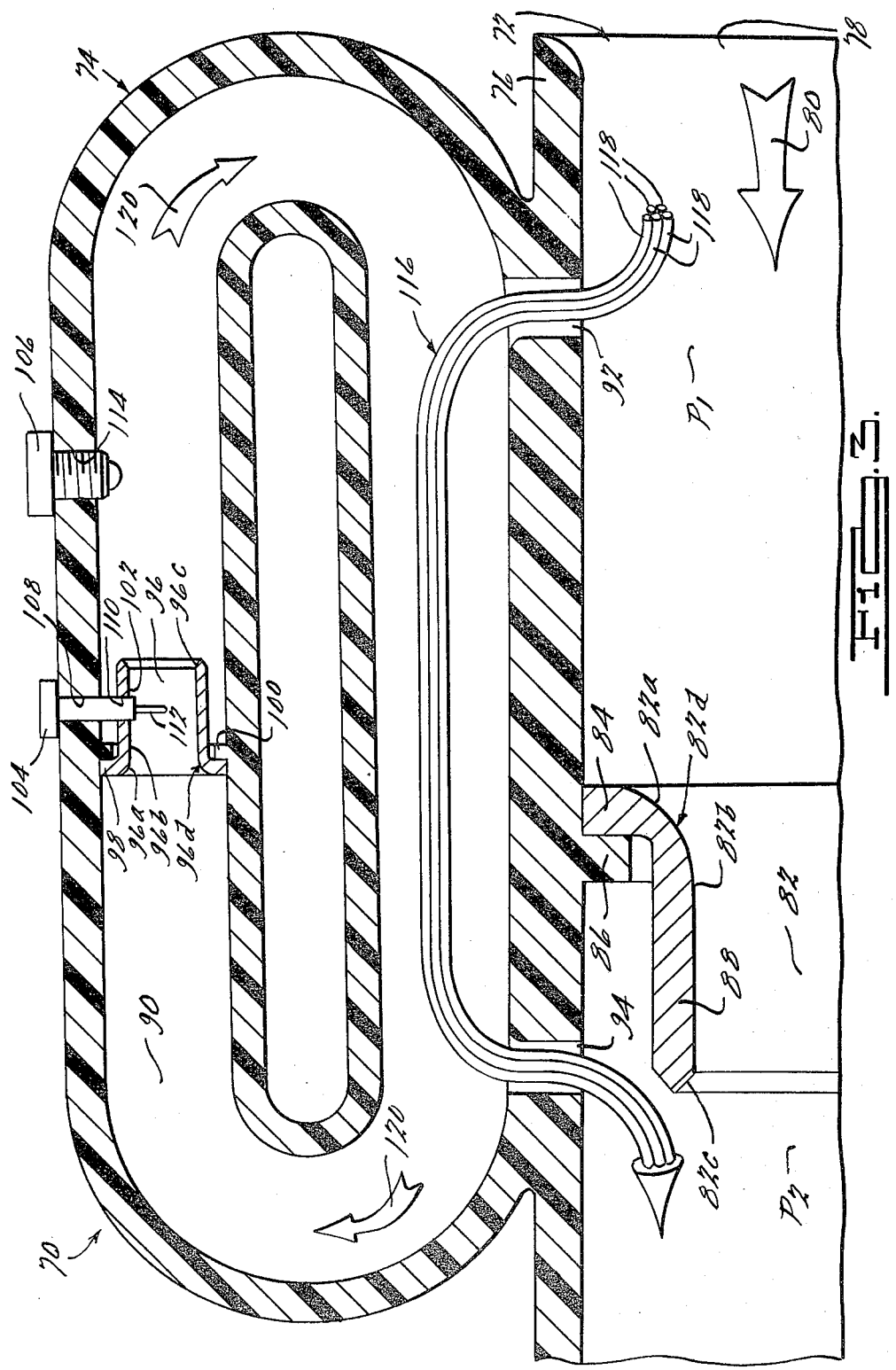
FIG. 3, is a cross-sectional view of an alternative embodiment of the inventive fluid flowmeter.

Referring to drawing FIGS. 1 and 2, the present invention provides a hot film mass air flowmeter 10 which is intended for automotive application to monitor mass airflow into a conventional internal combustion engine. A typical contemplated installation would entail incorporating flowmeter 10 into the air filter inlet horn present in most vehicles which is immediately upstream of the carburetor or injector body. Flowmeter 10 would be employed to provide continuous and dynamic control of the fuel quantity delivered to the engine in response to various speed, load, coolant temperature, and emissions control devices.

It is to be understood however, that in its broadest sense, the present invention can be employed with equal success in nonautomotive applications and in applications involving fluids other than air or air-gas mixtures. Accordingly, it is not to be construed as limiting in that context.

Referring to FIGS. 1 and 2, flowmeter 10 comprises a flowmeter section 12 and a sensor housing 14 formed on the outer surface thereof. Flowmeter section 12 is generally cylindrical and comprises an elongated tubular housing 16 which is open at both ends for inclusion in an air take ducting system of an automobile internal combustion engine. As illustrated, air flowing through flowmeter 10 will pass from left to right as viewed in FIG. 2. An arrow 18 is provided to indicate direction of normal airflow through flowmeter 10. Housing 16 defines a main air flow passage 20 within in which is disposed a first flow nozzle 22. Nozzle 22 comprises a substantially tubular body portion 24 oriented concentrically within airflow passage 20, and a circumferential flange 26 depending radially outwardly therefrom. The radially outward most extent of flange 26 abuts the inner surface of housing 16 to secure nozzle 22 in its illustrated position. A radially inwardly directed circumferential rib 28 is intregrally formed with housing 16. The lefthand most (as viewed in FIG. 2) surface of rib 28 is in an abuting relationship with the righthand most surface of flange 26 to locate nozzle 22 in its illustrated position within passage 20. Flange 26 forms a slight interference fit with housing 16 for retention in its illustrated position.

Nozzle 22 includes an inlet 22a for receiving substantially all of the fluid flowing within passage 20, of throat 22b and an outlet 22c which discharges the received portion back into the passage 20. The inner surface of nozzle 22 formed by inlet 22a and throat 22b defines a contour generally indicated at 22d which is elliptical as will be described in detail hereinbelow. However, depending upon the application, other contours, such as circular or constant acceleration could be employed such as discussed in U.S. Pat. No. 4,174,734. Accordingly, the present invention, in its broadest sense, is not to be considered limited to a particular contour type.

The operation of fluid flow restrictors such as nozzle 22 is generally well known in the art. Accordingly, the dynamics of the fluid flow resulting therefrom will not be elaborated upon in detail. The net effect of nozzle 22 is to establish a pressure differential thereacross where, for a steady state flow condition, the pressure immediately upstream thereof (designated $P_1$) will be higher than the fluid pressure immediately downstream therefrom (designated $P_2$). The surfaces of housing 16 defining passage 20 are generally smooth and include an aerodynamically tapered inlet shown generally at 30 to establish substantially laminar flow therethrough.

Sensor housing 14 is illustrated as being formed discreetly from tubular housing 16. However, it is contemplated that they, as well as nozzle 22, could be integrally formed by casting or molding processes well known in the art. In the present illustrative embodiment, sensor housing 14 is affixed to tubular housing 16 by screws or other suitable hardware (not illustrated).

Sensor housing 14 comprises a body portion 32 defining a generally elongated rectangular upwardly (in FIG. 2) opening cavity 34. Cavity 34 is closed in its uppermost extent by a cover 36 which is sealingly affixed to body portion 32 by hardware, welding, adhesives or other suitable method which provides substantially air-tight engagement therebetween. A bobbin 38 is nestingly disposed within cavity 34 and coacts with body portion 32 and cover 36 to define a closed circuitous viscous flow link or recirculation path 40. Recirculation path 40 has a line of elongation substantially parallel to the axis of flow passage 20 defined by housing 16.

Bobbin 38 is illustrated as integrally formed of plastic or other suitable material and is dimensioned for fixed retention within cavity 34 in the position illustrated.

Recirculation path 40 is thus positioned substantially adjacent airflow passage 20 and is in fluid communication therewith through an inlet port indicated generally at 42 located upstream of nozzle 22 and an outlet port indicated generally at 44 located radially adjacent outlet 22c of nozzle 22. Inlet port 42 is composed of registered circumferentially elongated radially extending aperatures 46 and 48 within housing 16 and body portion 32, respectively. Likewise, outlet port 44 is composed of registered circumferentially elongated radially extending apertures 50 and 52 within housing 16 and body portion 32, respectively. Ports 42 and 44 are substantially the same size.

Sensor housing 14 houses two transducers employed in a constant temperature thermal anemometer indicated generally at 54 (refer FIG. 4) as will be described in detail hereinbelow. Two components of anemometer 54 illustrated schematically in FIG. 4 which are illustrated in FIG. 2 comprise a hot film probe 56 and a temperature compensating probe 58. It is contemplated that special commercially available high-response probes can be employed with modifications such as described herein which, in light of the present specification, are well within the capability of one skilled in the art. For example, the applicant has found probes manufactured by Thermal Systems Inc. to be readily adaptable for application in the present invention, specifically hot film probe model 1269 and temperature compensated resistor probe model 1310. However, the recitation of these specific probe designs is intended to be by way of example only and not to be limiting in any sense.

Probe 56 passes downwardly through a bore 60 in cover 36 of sensor housing 14, terminating within recirculation path 40. A sensing element 62 depends from the lower most end of hot film probe 56 within recirculation path 40. Probe 56 is secured in its illustrated position by being press fit within bore 60. Although not illustrated, it is contemplated that sealing means such as o-rings would be provided to ensure against air leakage. Although any number of hot film or hot wire sensors are commercially available and are well suited for practicing the present invention, the applicant a probe such as that described in U.S. Ser. No. 300,790 filed Sept. 10, 1981 which is hereby incorporated herein by reference.

Temperature compensating probe 58 is threadably received within a bore 64 within cover 36 of sensor housing 14 and extends downwardly into recirculation path 40. Both sensors 56 and 58 are thus positioned to sense a sample fluid flow passing thereby within recirculation path 40. Probe 58 is also provided with a sealing means such as an o-ring to ensure substantially airtight fit.

Figure 4:
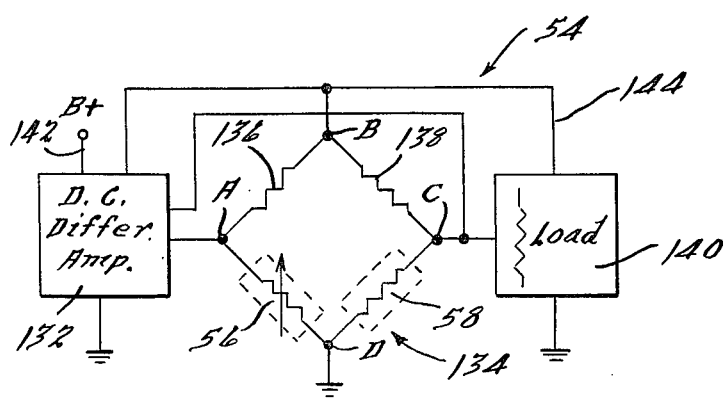
FIG. 4, is a schematic diagram of a constant temperature thermal anemometer employed within the flowmeter of FIGS. 1 and 2.
Figure 5:
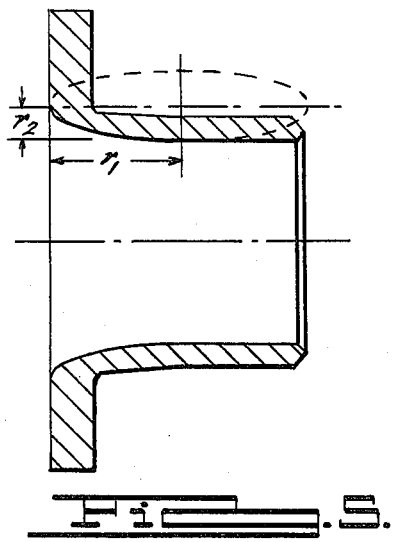
FIG. 5, is a cross-sectional view of an example of a flow nozzle employed within the flowmeter of FIG. 3, illustrating the internal contours thereof.

Two pairs of insulated electrical leads (not illustrated) are provided which electrically interconnect probe 56 and 58 with the remaining anemometer 54 circuitry illustrated in FIG. 4. For reasons which will become apparent upon further reading of this specification, placement of probes 56 and 58 can be anywhere within recirculation path 40. However, the preferred placement of probes 56 and 58 is anywhere other than the portion (indicated at 66) of recirculation path 40 which most directly interconnects inlet and outlet ports 42 and 44 for reasons which will be described in detail hereinbelow. Additionally, temperature compensating probe 58 is preferably positioned upstream of hot film probe 56 to negate any heating effect therefrom. The flow of sample fluid within recirculation path 40 is indicated by arrows 67. Finally, a protective cover 68 is provided to overlay the otherwise exposed portions of probes 56 and 58. Protective cover 68 is suitably affixed to the outer surface of cover 36.

Flowmeter 10 operates as follows: Ports 42 and 44 are positioned to sense the pressure differential $(P_1 - P_2)$ established by flow nozzle 22. Thus, relatively high pressure $(P_1)$ is impressed upon sample fluid within recirculation path 40 through inlet port 42 and relatively low pressure $(P_2)$ is impressed upon sample fluid within recirculation path 40 through outlet port 44. It is to be understood, that in its broadest sense, the present invention can be utilized with any differential pressure type flowmeter. Illustrated flowmeter 10 employs a flow nozzle 22. However, it could be of the orifice, venturi, elbow meter, Δp/swirl or frictional resistance type without departing from the spirit of the present invention. Thus, the differential pressure signal $P_1-P_2$ is fed or impressed upon a closed fluidic circuit (recirculation path 40) in a quasi-dipole configuration. This dipole flow (i.e. a doublet composed of a closely spaced source and sink) will, because of viscosity of the sample air, drive a recirculation of fluid within path 40 that effects hot film probe 56.

The space and magnitude of this "dipole" flow will give the best results if it is substantially cylindrical in shape, to keep fringing to a minimum with stream lines parallel to the cylinder axis. In addition, the flow should be either laminar or turbulent with a small mixing length. The dipole flow, which may be contaminated, will be separate from the sample air circulation within path 40 except for the common surface which is the outermost set of stream lines of the "dipole" flow. If the "dipole" flow is laminar and the contaminants are buoyant, there will be no mixing effect except by diffusing, hence the circulation is much cleaner than the fluid whose flow is being measured. If the "dipole" flow is slightly turbulent, then mixing is by convection (related to the product of the mixing length and the area of the surface) and diffusion. There also, the circulation in path 40 will be substantially cleaner than the fluid being measured. The amount of mixing is related to the magnitude of the circulation, and boundary conditions will be adjusted to suit the cleaniness required.

The present invention is relatively immune to sudden pressure impulses such as engine backfires in the principle flow path (in this case through nozzle 22). Such impulses will only have a minor effect on "dipole" flow and hence, the fragile sensing element 62 of hot film probe 56 will be protected.

The flow through nozzle 22 and the "dipole" flow (related to the circulation) are uniquely determined by the differential pressure $P_1-P_2$ so the hot film probe 56 can effectively measure the total or primary flow through nozzle 22. Additionally, viscosity variations caused by changes in temperature and humidity which will alter flow have been found to be relatively minor and then can be compensated for by temperature compensating probe 58.

The fluid dynamics of the present invention can be best envisioned by referring to FIG. 3, which illustrates an alternative embodiment of a hot film mass air flowmeter 70. Flowmeter 70 comprises a flowmeter section 72 and a sensor housing 74. Flowmeter section 72 comprises a tubular housing 76 which is open at both ends for inclusion in an air intake ducting system as described in the detailed description of a preferred embodiment of the invention and defines a main air flow passage 78. Arrow 80 indicates the normal direction of air flow through main air flow passage 78. A flow nozzle 82 is disposed concentrically within main air flow passage 78 and is secured to flowmeter section 72 by virtue of an integral radially outwardly directed circumferential flange 84 which is press fit within tubular housing 76 and which abuts a radially inwardly directed circumferential rib 86 to ensure the proper positioning thereof within air flow passage 78. Flow nozzle 82 includes a body portion 88 which depends from flange 84 and extends downstream thereof. Flow nozzle 82 includes an inlet 82a, a throat 82b and an outlet 82c. The radially inward most portion of flow nozzle 82 defining inlet 82a and throat 82b provides an aerodynamic contour designated generally at 82d.

Sensor housing 74 is integrally formed with tubular housing 76 and defines an elongated toroidal recirculation path 90 whose line of elongation is substantially parallel to the axis of main air flow passage 78. An inlet port 92 provides fluid communication between recirculation path 90 and a point within air flow passage 78 upstream of flow nozzle 82. Recirculation path 90 is also in fluid communication with another point within air flow passage 78 downstream from nozzle 82 through an outlet port 94 which, in the illustrated embodiment, is substantially axially aligned with outlet 82c of flow nozzle 82. Flow nozzle 82 will create a pressure differential thereacross designated by $P_1-P_2$ as was described in detail hereinabove.

A second flow nozzle 96 is disposed within recirculation path 90 and is secured therein by a radially outwardly extending circumferential flange 98 which is in a press fit relationship with the inner surface of sensor housing 74 and in an abutting relationship with a radially inwardly directed circumferential rib 100 which provides positive positioning of flow nozzle 96 within recirculation path 90. Flow nozzle 96 includes a body portion 102 depending integrally rightwardly from flange 98. Flow nozzle 96 includes an inlet 96a, a throat 96b and an outlet 96c. The radially innermost surface of flow nozzle 96 defined by inlet 96a and throat 96b forms a contour indicated generally at 96d. A hot film probe 104 and a temperature compensation probe 106 are carried by sensor housing 74. Hot film probe 104 is press fit within a bore 108 in sensor housing 74 and extends downwardly within recirculation path 90, through a registering bore 110 within body portion 102 of flow nozzle 96, terminating within the throat 96b region thereof. Probe 104 includes a sensing element 112 disposed generally centrally within the throat region of flow nozzle 96. Temperature compensation probe 106 threadably extends through a bore 114 within sensor housing 74 and terminates within recirculation path 90. In application, probes 104 and 106 would be incorporated within a constant temperature thermal anemometer (not illustrated) as was described in the detailed description of the preferred embodiment.

The "dipole" flow described hereinabove can best be conceptualized by a flow arrow indicated generally at 116. Some of the air entering flowmeter 70 will tend to be drawn into recirculation path 90 through inlet port 92 by virtue of $P_1$ exceeding the fluid pressure within recirculation path 90. Air will pass through port 92 in the form of discrete parallel streamlines 118 which, because of laminar flow within recirculation path 90, remain intact as they traverse the portion of recirculation path 90 most directly interconnecting inlet port 92 and outlet port 94. $P_2$ adjacent outlet port 94 within main air flow passage 78 will be at a pressure lower than that within recirculation path 90 and will thus tend to aspirate streamlines 118 back into the main air flow passage 78. Because of the small mixing length, there is little intermixing of the main stream air within streamlines 118 and the sample air within recirculation path 90. Movement of the air in streamlines 118 will, because of their viscosity, tend to circulate the relatively clean signal air within recirculation path 90 as indicated by arrows 120. As the sample air recirculating within path 90 impinges upon heated sensing element 112, there is a net heat transfer from sensing element 112 to the air impinging thereon. Flow nozzle 96 operates to create a localized area of increased velocity around sensing element 112 to provide better overall response.

Figure 7:
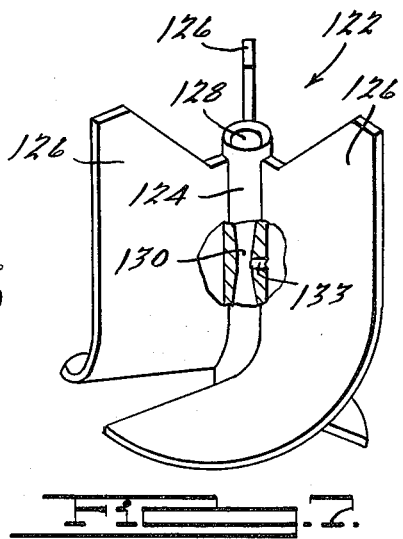
FIG. 7, is a perspective fragmented view of the swirl vane-venturi assembly employed within an alternative embodiment of the fluid flowmeter of FIG. 3.

As stated hereinabove, any other flow restriction means could be employed in place of a flow nozzle as should now be evident to one of ordinary skill in the art. For example, the application contemplates that Δp/swirl techniques could be substituted in place of the flow nozzle. FIG. 7 illustrates a venturi-swirl vane assembly 122 which, as an alternative embodiment of the invention, could be placed within air flow passage 20 of flowmeter 10 illustrated in FIGS. 1 and 2. Assembly 122 includes a venturi 124 and a set of three swirl vanes 126 which extend radially from the outer venturi 124 surface to the inner surface of housing 16. Swirl vanes 126 are circumferentially evenly spaced about main air flow passage 20 and support venturi 124 concentrically therein. The upstream most ends of swirl vanes 126 are oriented to be parallel to the direction of air flow 18 as it enters flowmeter 10 and thus constitutes straightening vanes which are integrally formed with the remainder of swirl vanes 126. The radially inner and outermost portions of vanes 126 are embedded in venturi 124 and housing 16, respectively. Although venturi 124 and swirl vanes 126 are shown as an assembly of discrete components, it is contemplated that they could be integrally formed by casting or molding processes well-known in the art. Although assembly 122 is illustrated as being composed of three individual swirl vanes 126, it is contemplated that more or fewer could be employed, depending upon the application contemplated without departing from the spirit of the present invention.

The optimum shape of swirl vanes 126 is empirically derived and depends upon the nature of the fluid being monitored as well as the range of flow rates being contemplated. The arrangement found by the applicant to be particularly effective for a typical four or six cylinder engine defines a complex plane as is illustrated in perspective FIG. 7. When assembled within housing 16, the radially outermost extent of vanes 126 would be embedded in the inner surface of housing 16. In such an arrangement, it is contemplated that appropriate mating slots be formed in the outer surface of venturi 124 as well as the inner surface of housing 16 to receive swirl vanes 126, which could be press fit therein, welded or otherwise suitably affixed for permanent retention.

The passageway through venturi 124 is defined as a secondary air flow passage 128 which will operate to intercept a portion of the air flowing through flowmeter 10 and reintroduce back into the main air flow passage 20 downstream therefrom. Venturi 124 may be replaced by a straight walled tube or a substantially straight walled tube. However, the venturi tube has been found to provide a lower static pressure, particularly when the total air flow through flowmeter 10 is low, and therefore a very high fluid flow rate velocity localized therein.

Venturi 124 is of conventional design and includes a throat 130 which, for purposes of the present specification, is defined as a point within the secondary air flow passage 128 in which the fluid passing therethrough attains a maximum velocity. Venturi 124 includes a radially extending bore 133 which, in application, would receive a tube (not illustrated) for providing direct fluid communication between throat 130 and outlet port 44. Because the operation of Δp/swirl type flowmeters has been described in detail elsewhere, a detailed description of its operation will be deleted here for the sake of brevity.

Referring to FIG. 4, a schematic diagram of anemometer 54 is illustrated. Anemometer 54 comprises an active power supply such as a DC differential amplifier 132 and a four element resistance bridge designated generally at 134. Bridge 134 is made up of four series connected elements, the point of interconnection of each adjacent pair of elements designated as nodes A through D. Nodes A and D, and B and C are interconnected by fixed value resistors 136 and 138, respectively. Nodes C and D are interconnected by probe 58 which, electrically, is a resistor whose value varies with ambient temperature. Finally, nodes D and A are interconnected by probe 56 which varies in resistance as a function of the velocity of the fluid impinging thereagainst. Restated, the resistance of probe 56 will vary directly as a function of its ability to transfer heat to the relatively cooler fluid impinging thereon. Because a fast response time to instantaneous changes in fluid flow rate is desirable in such devices, the thermal mass of the sensing element 62 of probe 56 has been minimized to provide more rapid and efficient transfer of heat directly to the fluid. It is this small thermal mass which has made most prior art devices extremely prone to breakage.

DC differential amplifier 132, node D and a load 140 (such as a readout or a controlled device) are grounded, or alternatively, commonly interconnected. Amplifier 132 has two input voltage terminals which are electrically connected to nodes A and C, an external power supply input terminal which is interconnected to a DC power supply through leads 142 and a bridge voltage output terminal which is electrically connected to node B and interconnected to load 140 through leads 144. An active power supply is defined as one which will continuously vary its output voltage, current, power factor or the like as a function of an input. Because the application of constant temperature thermal anemometers for measuring steady state as well as transient phenomena is fairly well-known in the art, a detailed description of all aspects of operation of anemometer 54 will be deleted here for the sake of brevity.

By placing a hot film surface sensor such as element 62 of probe 56 in recirculation path 40 and using the constant temperature principle by varying or modulating the current flowing therethrough to maintain a constant film temperature, the sensed sample flow through the recirculation path 40 is directly proportional to total flow. Restated, the electrical current required to keep the hot film temperature constant is directly related to mass flow. When the mass flow rate is to be determined, the bridge 134 must be rebalanced as a function of ambient temperature.

The linear correlation between sample flow rate through recirculation path 40 and total flow rate has been experimentally verified by the applicant. This is because the disclosed flowmeter does not depend upon or use localized air flow techniques to measure air flow, when localized air flow in some modes of operation may be far from representative of total air flow through the meter.

Figure 6:
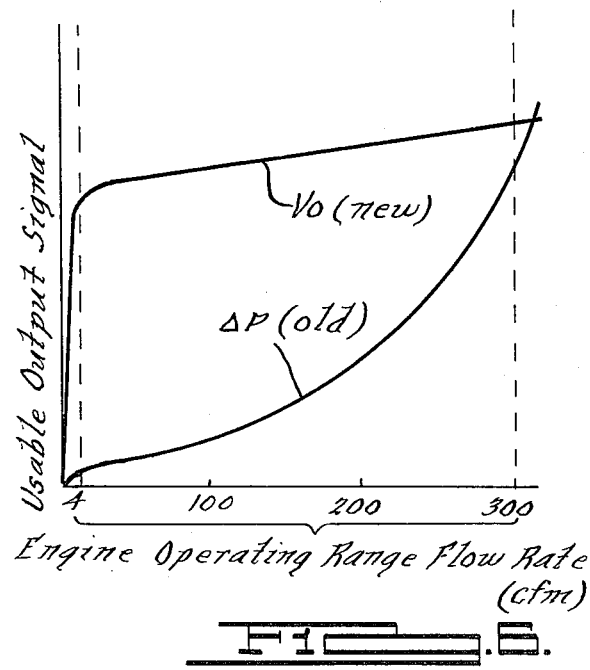
FIG. 6, is a differential pressure and output voltage (usable output signal) versus flow rate response graph contrasting the present invention with a typical prior art device.

The major advantage of the present invention over pneumatic type prior art devices is reflected in the graph illustrated in FIG. 6. A gross attenuation of usable output signal at low flow rates was a major shortcoming of such prior art devices. As the graph suggests, the present invention provides a substantial amount of usable signal output, even at minimal flow rates. As a result, substantially less complex downstream electronic control is required and the flowmeter can be detuned or desensitized to afford unit to unit repeatability.

The rate of heat loss from sensing element 62 of probe 56 is a direct measure of the product of air density and velocity. The current through sensing element 62 is so adjusted as to keep the sensor temperature, and thus resistance, constant. A feedback circuit is used to automatically maintain a desired (safe) hot film temperature for every velocity to prevent sensor burn-up. A thin layer of sputtered quartz can be supplied to protect the sensor. Additionally, a teflon or other light material can be supplied as a film to prevent contamination.

In an embodiment of the invention employing a flow nozzle in the recirculation path as well as the main air flow path, it has been found desirable to maintain the same ratio of $r_1$ to $r_2$ for all nozzles in the system. This will ensure that the respective fluid flows therethrough will follow the same square root relationship and thus the "dipole"—sample fluid coupling regime will be linear. Although characteristic pressure drop or other fluid stream characteristics may vary between the flow nozzles, there will be a unique relation therebetween and thus they will be directly correlatable. This feature will also make the present invention insensitive to velocity inlet profile variations and allow single point sensing of total volumetric or mass flow rates.

The applicant contemplates that a series of flow nozzles can be provided having identically dimensioned flanges for mounting within a common flowmeter section and step-wise varing dimensioned inlets and throats. This would allow a single flowmeter to be marketed which can be tailored or modified by a selecting a flow nozzle or nozzles having known flow characteristics for a particular application or to accommodate tolerance variations within a particular application. The $r_1$ to $r_2$ ratio could be maintained for each nozzle in the series.

It is to be understood that the invention has been described with reference to several specific embodiments which provide the features and advantages previously described, and that as such specific embodiments are susceptible of modification as will be apparent to those skilled in the art. For example, the dimensions, relative sizing of the main flow passage and the recirculation path can be altered in various ways to accommodate a specific application without departing from the spirit of the present invention. Accordingly, the foregoing description is not to be construed in the limiting sense.

I claim:

1. A fluid flowmeter comprising:
   means defining a passage for the flow of a fluid therethrough;
   flow restriction means within said passage and operative to establish a fluid pressure differential thereacross as a function of said fluid flow;
   means defining a closed recirculation path disposed adjacent said passage and in fluid communication therewith through an inlet port upstream of said restriction means and an outlet port downstream of said restriction means; and
   sensing means operative to monitor fluid flowing in said recirculation path and to generate a fluid condition signal as a function thereof.

2. The flowmeter of claim 1; wherein said fluid condition signal represents total flow rate.

3. A fluid flowmeter comprising:
   means defining a main passage for the flow of a fluid therethrough;
   flow restriction means disposed within said main passage and operative to establish a fluid pressure differential thereacross as a function of said fluid flow;
   means defining a closed recirculation path disposed adjacent said main passage and in fluid communication therewith through an inlet port upstream of said restriction means and an outlet port downstream of said restriction means; and
   a constant temperature thermal anemometer operative to monitor the rate of flow of fluid flowing in said recirculation path and to generate a total flow rate output signal as a function thereof.

4. The flowmeter of claim 3, wherein said recirculation path defines a generally elongated torus-shaped cavity having a line of elongation substantially parallel to the direction of fluid flow within said main passage.

5. The flowmeter of claim 3, wherein said anemometer comprises:
   a temperature dependent resistance element for sensing said recirculation path fluid flow rate; and
   means operative to establish an electric current within said element and to modulate said current to maintain said element at a substantially constant temperature whereby the extent of said modulation is representative of total fluid flow through said main passage.

6. The flowmeter of claim 3, wherein said flow restriction means comprises an inlet for receiving at least a portion of the fluid flowing in said main passage, a throat and an outlet for discharging said received portion back into said main passage.

7. The flowmeter of claim 6, wherein said flow restriction means discharges said received portion back into said main passage at a point substantially adjacent said outlet port.

8. The flowmeter of claim 6, wherein said flow restriction means receives substantially all of the fluid flowing in said main passage.

9. The flowmeter of claim 6, wherein said inlet and throat jointly define a predetermined aerodynamic profile.

10. The flowmeter of claim 3, wherein said ports comprise circumferentially elongated slots.

11. The flowmeter of claim 3, further comprising recirculating flow restriction means disposed within said recirculation path operative to establish a localized region of relatively high velocity fluid.

12. The flowmeter of claim 11, wherein said anemometer is operative to monitor said recirculating fluid within said localized region.

13. The flowmeter of claim 11, wherein said recirculating flow restriction means comprises an inlet for receiving at least a portion of the fluid flowing in said recirculation path, a throat and an outlet for discharging said received portion back into said recirculation path.

14. The flowmeter of claim 13, wherein said recirculating flow restriction means receives substantially all of the fluid flowing in said recirculation path and defines a predetermined aerodynamic contour.

15. The flowmeter of claim 14, wherein said main flow passage flow restriction means comprises an inlet for receiving at least a portion of the fluid flowing in said main passage, a throat and an outlet for discharging said received portion back into said main passage, said main flow passage flow restriction means defining a predetermined aerodynamic profile.

16. The flowmeter of claim 15, wherein said contour and profile are substantially of like shape.

17. The flowmeter of claim 6, wherein said flow restriction means comprises a venturi.

18. The flowmeter of claim 17, further comprising means defining a conduit disposed intermediate said outlet port and said throat.

19. The flowmeter of claim 17, further comprising means operative to receive at least a portion of the remaining fluid in said main passage and impart a velocity vector thereto tangential to an axis defined by said main passage for creating a reduced pressure area at the outlet of said venturi.

20. The flowmeter of claim 19, wherein said means operative to receive said remaining fluid comprises a set of swirl vanes radially disposed within said main passage at an angle oblique to the flow direction of said remaining fluid.

21. The flowmeter of claim 3, wherein said anemometer comprises ambient temperature compensation means.

22. The flowmeter of claim 21, wherein said ambient temperature compensation means comprises a fluid temperature sensing probe disposed within said recirculation path.

23. A fluid flowmeter comprising:
means defining a main passage for the flow of a fluid therethrough;
flow restriction means disposed within said main passage and operative to establish a fluid pressure differential thereacross as a function of said fluid flow;
means defining a closed recirculation path disposed adjacent said main passage and in fluid communication therewith through an inlet port upstream of said restriction means and an outlet port downstream of said restriction means;
a temperature dependent resistance element for sensing the rate of flow of fluid flowing in said recirculation path; and
means operative to establish an electric current within said element and to modulate said current to maintain said element at a substantially constant temperature whereby the extent of said modulation is representative of total fluid flow through said main passage.

24. A fluid flowmeter comprising:
a housing defining a main passage for the flow of a fluid therethrough and including a central axis;
flow restriction means disposed within said main passage and operative to establish a relatively high pressure region upstream therefrom and a relatively low pressure region downstream therefrom;
means defining a closed recirculation path disposed adjacent said main passage, said recirculation path forming an elongated generally torus-shaped cavity having a line of elongation substantially parallel to said central axis;
an inlet port effecting fluid communication between said recirculation path and said high pressure region;
an outlet port axially spaced from said inlet port and effecting fluid communication between said recirculation path and said low pressure region; and
a constant temperature thermal anemometer operative to monitor the rate of flow of fluid flowing in said recirculation path and to generate a total flow rate output signal as a function thereof.

25. The fluid flowmeter of claim 24 wherein said ports comprise circumferentially elongated slots extending radially through said housing.

26. A fluid flowmeter comprising:
means defining a main passage for the flow of a fluid therethrough;
flow restriction means disposed within said main passage and operative to establish a fluid pressure differential thereacross as a function of said fluid flow;
means defining a closed recirculation path disposed adjacent said passage and in fluid communication therewith through an inlet port upstream of said restriction means and an outlet port downstream of said restriction means, said inlet and outlet ports being closely coupled within a portion of said recirculation path to effect a sample flow within said portion as a function of said pressure differential, said sample flow effecting a unidirectional recirculating flow of fluid within said path; and
sensing means operative to monitor said recirculating fluid flow within said recirculation path and to generate a fluid condition signal as a function thereof.

27. The flowmeter of claim 26, wherein said sensing means comprises means for sensing said recirculating fluid flow within another portion of said recirculation path distal said inlet and outlet ports.

* * * * *